O. F. STARR.
PROCESS FOR DISPOSAL OF SEWAGE BY MICRO ORGANISMS.
APPLICATION FILED APR. 10, 1914. RENEWED FEB. 12, 1917.
1,223,004.  Patented Apr. 17, 1917.
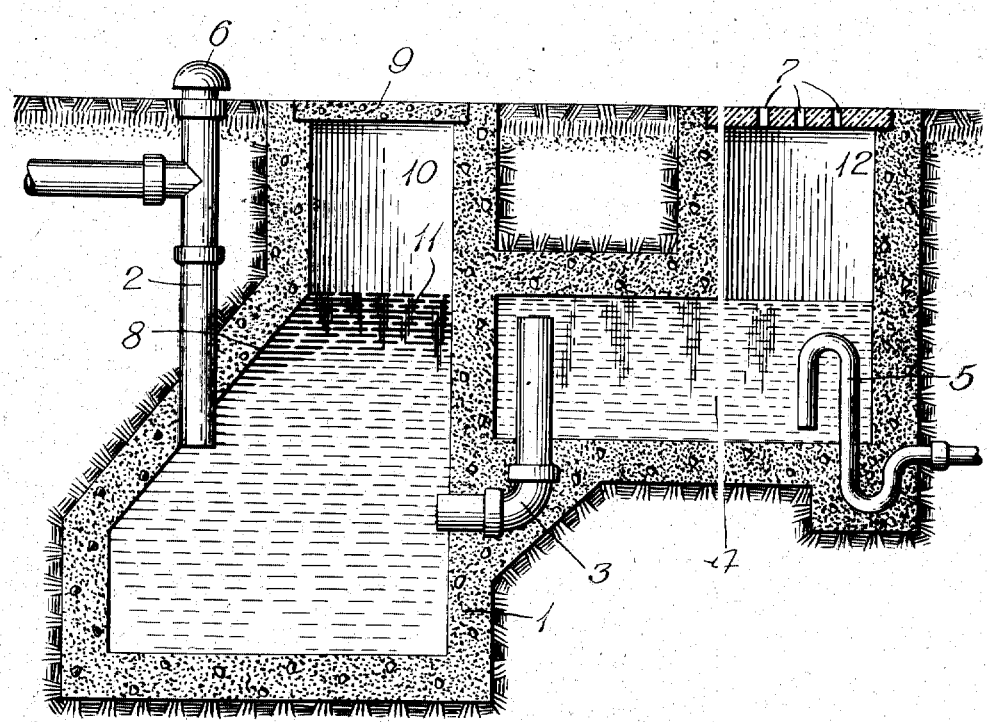
Witnesses
Chas. W. Stauffiger
O. W. Pickering
Inventor
Oliver F. Starr,
by Henry S. Blackmore
Att'y.

UNITED STATES PATENT OFFICE.

OLIVER F. STARR, OF UTICA, NEW YORK, ASSIGNOR OF ONE-HALF TO EDWARD A. ROBINSON, OF MOUNT VERNON, NEW YORK.

PROCESS FOR DISPOSAL OF SEWAGE BY MICRO-ORGANISMS.

1,223,004.

Specification of Letters Patent. Patented Apr. 17, 1917.

Application filed April 10, 1914, Serial No. 830,874. Renewed February 12, 1917. Serial No. 147,981.

*To all whom it may concern:*

Be it known that I, OLIVER F. STARR, a citizen of the United States, residing at Utica, in the county of Oneida and State of New York, have invented certain new and useful Improvements in Processes for Disposal of Sewage by Micro-Organisms, of which the following is a specification.

This invention relates to the disposal of sewage and waste material and particularly that class of inventions which include the action of micro-organisms, such as anaerobic bacteria, and has for its object the disintegration and disposal of solid ingredients in sewage in a simple and economical manner, in less time and with greater facility and efficiency than with other processes employed hereto and in such a manner that the solids are converted into liquids and the physical removal of solids becomes unnecessary and is avoided, and it comprises exposing the sewage to the action of micro-organisms, such as anaerobic bacteria in a confined space under pressure in the presence of a fluid, such as water, capable of dissolving increased volumes of gas, such as carbon dioxid, or hydrogen sulfid, evolved during the decomposition of the sewage, whereby the micro-organisms are concentrated and maintained in a more active condition and brought directly into contact with the solids to be disintegrated by prevention of isolation from water by gas which occurs from accumulation of gases when dissociation takes place at or under ordinary atmospheric pressure. Also the concentration of action through contacting ingredients of solids associated with the micro-organisms and conserving the heat whereby the propagation of the micro-organisms is facilitated producing increased decomposition action, is augmented. The increasing density of the fluid vehicle through the accumulating fluid or soluble products of decomposition tend to increase the flotation of the undecomposed solids and concentrate and condense the same upon and at the surface in the disintegrating chamber, the decomposition products being removed and the supporting fluid densified by circulatory displacement within and throughout the decomposing solids, and the aeration of the solids by gaseous products in which they are being dissolved in the associated water under pressure also tends to facilitate the solid flotation and maintenance thereof in the selective decomposition zone or area which is restricted and under increased pressure with consequent concentration of the material, micro-organisms, and heat, all of which coact to increase the final results.

The preferred species of the present invention is that which includes the employment of micro-organisms of varying character and which involve the exposing of sewage to successive and relatively increased and decreased pressure and in the absence and presence of air and light, the first step in the process being under the general conditions hereinbefore described for the initial disintegration, decomposition and dissolution of the solids and removal therefrom of the fluid products by circulatory displacement.

As an illustration of the process and a means whereby this process is carried out and the results obtained, the disintegration, decomposition and removal of solid matter from reservoirs containing the discharged fluids from water-closets and the like will be taken, reference being directed to the accompanying drawing.

The figure represents a longitudinal vertical section of a complete and preferred form of an apparatus comprising a plurality of reservoirs and communicating ducts in which the process may be carried out.

Referring to the drawing the numeral 1 represents a receptacle or reservoir in which solid matter is conserved and subjected to the action of micro-organisms under pressure in a restricted area, such as shown between 8 and 11 at the top of the fluid in receptacle or chamber 1, at selective temperatures and particularly to that variety of micro-organisms known as anaerobic bacteria, the chamber or reservoir 1 being closed by the cover closure 9 and provided with the inlet 2 and the outlet 3. The inlet 2 is provided with the vent 6 and communicating with the reservoir or chamber 1 at a point which will be above the bottom and below the surface of the fluid in the chamber, as is also the outlet 3, whereby materials are introduced sufficiently below the surface of the decomposition vehicle, and the discharge therefrom of the products being at points which will not interfere with or disturb the decomposing action of the micro-organisms. The outlet 3 communicates with a second purifying chamber or reservoir 4 into which the fluid products produced in the chamber or reservoir 1 are conveyed and there subjected to the action of air and light in order to destroy the anaerobic organisms and subject the product to another variety of organism, such as aerobic bacteria, light and air being introduced into the chamber or reservoir 4 through the chamber 12 by means of the perforated cover 7 which is preferably constructed of heavy glass in order to facilitate the passage through of light and introduction of the same into the chamber or reservoir 4.

The chamber or reservoir 4 is provided with the restricted and constricted siphonic discharge duct 5, so constructed and adjusted as to automatically discharge the accumulated liquid products of the decomposition at intervals and maintain a column of back pressure against which it is discharged, whereby the pressure at the closed or sealed surface at the top of the fluid in chamber 1 as shown at 11 against the gaseous cushion 10 is maintained and the solids rising and accumulating under the seal 11 at the top of the decomposition fluid or vehicle in the reservoir 1 are under increased pressure and where the action of the anaerobic micro-organisms is facilitated, the gases removed by solution and the decomposition zone or area restricted and selectively heated through the conservation thereof by the heat non-conductive cover or seal coating 11 where the more highly heated strata of the fluid in the reservoir 1 resides, the micro-organisms thriving and acting upon solids beneath the seal as indicated by the dark area along the angular wall of the reservoir at 8 and across the surface between 8 and 11 as shown by the darkened lines.

In carrying out the process sewage is introduced into the receptacle or reservoir 1 through the inlet 2 whereby the solid content rises and travels along the incline wall 8 to the surface 11 where it accumulates and shortly forms a seal between the walls of the receptacle which are progressively upward diminishing. As soon as a seal is formed it becomes converted gradually into a solid superficial layer under which the solids thereafter accumulate, displacing water or other fluid from the receptacle 1 into receptacle 4 and increasing the pressure upon the solids beneath the seal in an upward direction from below. The anaerobic bacteria associated with the solids then gradually begin to accumulate and propagate and become attached to the upper portions of the walls of the receptacle as shown at 8 and beneath the crust or seal 11. During the decomposition or disintegration of the solid material by the anaerobic bacteria such gases as carbon dioxid and hydrogen sulfid which are ordinarily liberated under ordinary atmospheric pressure become dissolved in the associated water by reason of its increased pressure and greater solvency of the gas under those conditions, so that increments of the solid which ordinarily become separated and isolated by the gaseous envelop produced are brought in close contact by the removal of such gas in the manner described and the solids concentrated or compressed in such a manner that the anaerobic bacteria are facilitated in their decomposing action and the products produced by the disintegration and decomposition are readily dissolved in the associated water, which increased density further augments the flotation and increase of pressure against the solids intervening between the crust or seal 11 and the surface of the water or liquid in reservoir 1, any heat which is conveyed into the reservoir with the entering sewage or which may be produced by the action of micro-organisms on decomposition of the solids accumulates within the strata beneath the non-heat conductive crust or seal 11 and maintains the decomposing or disintegrating strata at a selective temperature at which the anaerobic bacteria may perform its greatest work in the shortest time. As the products of decomposition or disintegration of the solids at the surface of the water or fluid in chamber or receptacle 1 become dissolved in the water or fluid, it gradually passes out into the reservoir 4 through the outlet 3 between the bottom of the receptacle and below the point at which the anaerobic decomposition or disintegration of the solids is taking place. As the fluid enters the chamber or receptacle 4 it is subjected to the action of light and air which purifies it and kills the anaerobic bacteria; at this point the fluid is subjected to another variety of micro-organism known as the aerobic variety which has a purifying effect on the dissolved contents and through the action of air and light it becomes deprived of its toxic nature and the dissolved gases oxidized and removed. From the reservoir 4 the final product of fluid nature is from time to time automatically discharged through the siphonic outlet 5 which is regulated and constructed in such a manner as to resistance in pressure as to discharge the fluid against a pressure or head of liquid in reservoir 4 whereby pressure is imparted hydrostatically against the solid matter beneath the crust or seal 11 in receptacle 1 and the liquid therein for the purpose of facilitating decomposition of the solid and removal of the soluble or liquid products as hereinbefore set forth and hereafter claimed.

The aeration of the fluids or substances in the chamber or receptacle 4 is accomplished by the suction produced by the periodical discharge and fill of substances therefrom and thereto from time to time through siphon 5 as the fluid accumulates in the receptacle or chamber to a sufficient height to produce pressure enough to start the discharge of the material through the back-checked outlet and the air taken in such receptacle is eventually forced out upon the refilling of the receptacle with fluid through the overflow of the pressure stand pipe of the inlet 3 from the reservoir or receptacle 1.

This discharge and refill acts as a hydrostatic bellows for the aeration of the receptacle and the fluid contents therein or passing therethrough.

After each discharge of fluid from chamber or reservoir 4 through outlet 5, fresh air is drawn into and fills the chamber so that as the fluid enters by over-flow of stand-pipe 3 it is brought into close and intimate contact with the air by trickling down over the outside of the pipe into the then air containing chamber or reservoir 4, and is incrementally oxidized, thereby killing the anaerobic bacteria and is thus thoroughly acted upon in a continuous and automatic manner.

It will be noticed that the selective pressure and heat zone for action of anaerobic bacteria in chamber or reservoir 1 at 8 and under the crust or seal 11 through the accumulation of floating solids results in the compression of the solids by upward pressure, thus bringing them in closer contact and the separation of fluid products of bacteria disintegration by solution and circulatory displacement, which accumulation of dissolved substance or product increases the specific gravity of the associated fluid and tends to enhance the floating of solids and formation of compression from accumulation thereof at the top of the chamber or reservoir 1 under the seal or crust 11.

The reservoirs as shown are constructed of concrete and provided with vitrified conduits providing inlets and outlets and communicating ducts and the receptacle 1 is shown constructed in a form whereby the upper part presents less area than that at the lower so that the shortest or smallest possible surface or surface area may be presented in the formation of the sealing crust and whereby the heated zone and decomposition or disintegrating sphere is concentrated and prevented from cooling or other interfering disturbance by the liquid substances or contents of the sewage which pass in and out below this quiescent decomposition sphere wherein the selective decomposition of the solid is performed.

The material of which the apparatus or various chambers or receptacles are constructed may be of metal or any other substance and the form, shape or construction may be of any character so long as the integrity of the co-acting members of the combination is maintained and that they are within operative and practical relation to and in communication with each other, one of the important features being that means is provided whereby the anaerobic decomposition of solids may be accomplished in the smallest space and under the greatest pressure whereby the most selective temperature and condition may be secured and whereby gaseous products which might otherwise be produced are dissolved and removed from the ingredients bringing them in closer contact and preventing their isolation by gaseous envelops whereby the propagation of the bacteria is enhanced and their decomposition action facilitated.

Having now described my invention, what I claim as new, and desire to secure by Letters Patent, is:—

1. The process of sewage disposal which comprises excluding light and air from said sewage, disposing said sewage while out of contact with light and air in such manner as to provide a restricted anaerobic area, wherein the surface of the liquid is materially smaller than the cross sectional area at the bottom of the pool, substantially as specified.

2. The process of sewage disposal, which comprises excluding light and air from said sewage, disposing said sewage in a pool in such manner as to provide a restricted area to the upper surface of said sewage to concentrate micro organisms within said restricted area, the surface of the liquid in said restricted area being materially smaller than the cross sectional area at the bottom of the pool and providing gaseous pressure greater than atmospheric pressure upon said restricted area beneath the scum surface, substantially as specified.

3. The process of sewage disposal which comprises disposing said sewage in a pool in such manner as to provide a restricted surface area, wherein the surface of the liquid is materially smaller than the cross sectional area at the bottom of the pool, then subjecting said sewage to pressure under exclusion of light and air, then subjecting said sewage to a non-disturbing inflow and outflow.

4. The process of sewage disposal which comprises secluding a pool of sewage having a non-disturbing inflow and outflow from light, air and agitation until a mass of micro-organisms has been developed of a character and quantity sufficient to liquify the solid mass of the flowing sewage, disposing said pool of sewage in such manner as to provide a restricted surface area that is materially smaller than the cross sectional area at the bottom of the pool to concentrate the micro-organic action in the upper portion of said pool, then providing for the accumulation of gases to produce gaseous pressure greater than atmospheric pressure under the surface of said pool.

5. The process of disposing of sewage which comprises secluding a pool of sewage from light and air, disposing said pool of sewage in such a manner as to provide a concentrated micro-organic action in the upper portion of the pool adjacent the surface thereof by arranging said pool in such manner that the surface of the liquid is materially smaller than the cross sectional area at the bottom of the pool, conserving the heat produced by the action of said micro-organisms, and then providing a non-disturbing inflow and outflow beneath the surface of said pool.

6. The process of sewage disposal which comprises providing a pool of sewage wherein horizontal cross sectional areas of said pool gradually diminish from the bottom of the pool to the surface thereof thereby disposing the liquid in such manner that the surface thereof is materially smaller than the cross sectional area at the bottom of the pool, excluding light and air from said pool, and providing a non-disturbing inflow and outflow for said pool beneath the upper surface thereof.

7. The process of sewage disposal which comprises disposing a pool of sewage in such manner that horizontal cross sectional planes thereof gradually diminish in area from the bottom of said pool to the surface thereof thereby disposing the liquid in such manner that the surface area is materially smaller than the cross sectional area at the bottom of the pool, excluding light and air from said pool, providing gaseous pressure upon the surface of said pool, then providing a non-disturbing inflow and outflow to said pool to maintain the surface thereof at substantially a predetermined level.

8. The process for sewage disposal which comprises secluding a pool of sewage having a non-disturbing inflow and outflow from light, air and agitation until a mass of micro-organisms has been developed of the character and quantity specified to liquify the solid mass in said flowing sewage, said pool being disposed in such manner as to provide that the surface of the pool is of a materially smaller area than is the cross sectional area at the bottom of the pool, then providing for the accumulation of gases to produce gaseous pressure greater than atmospheric pressure under the surface of said pool.

9. The process of sewage disposal which comprises disposing said sewage in a pool wherein the surface of the pool is materially smaller in cross sectional area than is the bottom of the pool, excluding light and air from said pool, providing a non-disturbing inflow and outflow beneath the upper surface thereof, disposing the outflow from said pool in a second pool, subjecting said second pool to light and air, and intermittently discharging said second pool.

10. The process of sewage disposal which comprises disposing said sewage in a pool in such manner as to provide a restricted area at the upper surface of said pool to concentrate micro-organisms within said restricted area, providing said pool with a non-disturbing inflow and outflow, excluding light and air from said pool, disposing the outflow liquors in a second secluded pool, providing for the introduction of light and air in said second pool, intermittently discharging said second pool and providing for an inflow of air to said second pool when the intermittent discharge has taken place.

11. The process of sewage disposal which comprises disposing said sewage in a pool to provide a relatively small surface as compared to the cross sectional area at the bottom of the pool, thereby increasing the density of the scum upon said surface, permitting the accumulation of gaseous pressure beneath said scum surface and without breaking or disturbing said scum surface, excluding light and air from said pool, then subjecting said sewage to a non-disturbing inflow and outflow.

12. The process of disposal of sewage which comprises disposing said sewage in a pool secluded from light and air, disposing said pool in such manner as to provide that the surface of the liquid is of materially smaller area than the cross sectional area at the bottom of the pool in order to increase the density of the scum in the upper portion of the said pool, conserving the heat produced in the region of said scum surface, and then providing an inflow and outflow beneath said scum surface.

13. The process of disposal of sewage which comprises incrusting the surface of a pool of sewage while in a quiescent condition, maintaining a pressure beneath the crust from gases accumulating in the mass of the pool while excluding light and air which pressure is in addition to the pressure due to the normal hydrostatic head of the liquid forming the pool, and finally subjecting the sewage to the action of light and air.

14. The process of disposal of sewage which comprises incrusting the surface of a pool of sewage while in a quiescent condition, hydrostatically maintaining a pressure beneath the crust from gases accumulating in the mass of the pool while excluding light and air by maintaining a predetermined hydrostatic head in the outflow from the pool, and finally subjecting the sewage to the action of light and air.

In witness whereof I have hereunto set my hand and seal in the presence of two witnesses.

OLIVER F. STARR. [L. S.]

Witnesses:
ROBT. GILMOUR FINLAY,
A. W. PICKERING.